(12) United States Patent
Lagnado et al.

(10) Patent No.: US 11,323,879 B2
(45) Date of Patent: May 3, 2022

(54) DEVICE MANAGEMENT

(71) Applicant: HEWLETT-PACKARD DEVELOPMENT COMPANY, L.P., Houston, TX (US)

(72) Inventors: Isaac Lagnado, Houston, TX (US); Danny Farnyih Meng, Houston, TX (US); Steven Petit, Houston, TX (US); Chung-Chun Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 874 days.

(21) Appl. No.: 16/077,301

(22) PCT Filed: Jul. 18, 2017

(86) PCT No.: PCT/US2017/042579
§ 371 (c)(1),
(2) Date: Aug. 10, 2018

(87) PCT Pub. No.: WO2019/017903
PCT Pub. Date: Jan. 24, 2019

(65) Prior Publication Data
US 2021/0211877 A1 Jul. 8, 2021

(51) Int. Cl.
*H04W 12/069* (2021.01)
*H04W 12/106* (2021.01)
(Continued)

(52) U.S. Cl.
CPC ......... *H04W 12/069* (2021.01); *H04L 63/105* (2013.01); *H04W 12/0431* (2021.01);
(Continued)

(58) Field of Classification Search
CPC ...... G06F 1/3209; G06F 21/44; G06F 9/4401; G06F 9/4418; H04L 63/105;
(Continued)

(56) References Cited

U.S. PATENT DOCUMENTS 7,746,810 B2 * 6/2010 Sinha ................ H04W 52/0203
370/278
8,078,722 B2 * 12/2011 Harvey ............... H04L 63/1416
709/224

(Continued)

FOREIGN PATENT DOCUMENTS

WO    WO-2016068848    5/2016

OTHER PUBLICATIONS

Search Query Report from IP.com (performed Sep. 29, 2021) (Year: 2021).*

(Continued)

*Primary Examiner* — Sharon S Lynch
(74) *Attorney, Agent, or Firm* — Brooks, Cameron & Huebsch PLLC

(57) ABSTRACT

Example implementations relate to device management. In some examples, a system may include a computing device comprising executable instructions to authenticate the computing device to a first wireless network, implementing a first level of security, while in an active state. A system may include a computing device comprising executable instructions to disconnect from the first wireless network responsive to entering a sleep state. A system may include a computing device comprising executable instructions to provide, from a basic input/output system (BIOS) of the computing device, a wireless parameter for a second wireless network implementing a second level of security. A system may include a computing device comprising executable instructions to connect to the second wireless network while in the sleep state.

13 Claims, 3 Drawing Sheets

(51) Int. Cl.
*H04W 12/0431* (2021.01)
*H04W 12/50* (2021.01)
*H04L 9/40* (2022.01)
*H04W 84/12* (2009.01)
*H04L 29/06* (2006.01)

(52) U.S. Cl.
CPC ......... *H04W 12/106* (2021.01); *H04W 12/50* (2021.01); *H04W 84/12* (2013.01)

(58) Field of Classification Search
CPC ............. H04W 12/0431; H04W 12/06; H04W 12/069; H04W 12/106; H04W 12/50; H04W 12/67; H04W 52/028; H04W 76/10; H04W 76/27; H04W 76/30; H04W 84/12; H04W 88/06; Y02D 30/70
See application file for complete search history.

(56) References Cited

U.S. PATENT DOCUMENTS

| | | | | |
|---|---|---|---|---|
| 8,199,915 B2* | 6/2012 | Shibasaki | ............ | H04W 12/047 380/270 |
| 8,411,662 B1* | 4/2013 | Saund | .................. | H04W 76/14 370/345 |
| 8,427,991 B2* | 4/2013 | Kholaif | ............. | H04W 52/0225 370/311 |
| 8,942,133 B2* | 1/2015 | Kumar | .................. | H04W 76/11 370/252 |
| 9,030,985 B2* | 5/2015 | Kholaif | ............. | H04W 12/0433 370/311 |
| 9,152,195 B2* | 10/2015 | Cheston | .................. | H04L 12/12 |
| 9,693,366 B2* | 6/2017 | Adjakple | ................ | H04L 67/10 |
| 10,250,386 B2* | 4/2019 | Nix | ....................... | H04L 63/061 |
| 2002/0174335 A1* | 11/2002 | Zhang | .................. | H04L 63/164 713/168 |
| 2004/0003273 A1* | 1/2004 | Grawrock | ............... | G06F 21/79 713/193 |
| 2005/0047356 A1* | 3/2005 | Fujii | ..................... | G06F 1/3209 370/311 |
| 2006/0067272 A1* | 3/2006 | Wang | .................... | H04W 60/00 370/331 |
| 2006/0224905 A1* | 10/2006 | Plante | .................... | G06F 1/3203 713/300 |
| 2007/0079359 A1 | 4/2007 | Lagnado | | |
| 2007/0105540 A1 | 5/2007 | Yu et al. | | |
| 2007/0230393 A1* | 10/2007 | Sinha | ..................... | H04W 76/38 370/328 |
| 2008/0222714 A1 | 9/2008 | Wahl | | |
| 2008/0244262 A1* | 10/2008 | Du | ....................... | H04W 12/062 713/155 |
| 2009/0059829 A1* | 3/2009 | Bachmann | ........ | H04W 36/0058 370/311 |
| 2009/0083555 A1* | 3/2009 | Challener | ........... | H04L 63/1441 713/310 |
| 2009/0158032 A1* | 6/2009 | Costa | ...................... | H04L 63/10 713/156 |
| 2009/0300763 A1* | 12/2009 | Harvey | ............... | H04L 63/1441 726/23 |
| 2010/0077190 A1* | 3/2010 | Brown | ....................... | G06F 8/60 713/2 |
| 2011/0085447 A1* | 4/2011 | Kholaif | ............... | H04W 12/069 370/242 |
| 2011/0191610 A1 | 8/2011 | Agarwal et al. | | |
| 2012/0210112 A1 | 8/2012 | Suganami | | |
| 2013/0208891 A1* | 8/2013 | Kholaif | ............. | H04W 12/0433 380/270 |
| 2013/0332598 A1* | 12/2013 | Boodannavar | .......... | H04L 12/12 709/224 |
| 2014/0056293 A1* | 2/2014 | Kumar | .................. | H04W 76/11 370/338 |
| 2014/0086177 A1* | 3/2014 | Adjakple | ............... | H04W 74/04 370/329 |
| 2014/0181500 A1 | 6/2014 | Mann et al. | | |
| 2014/0181535 A1 | 6/2014 | Smith et al. | | |
| 2014/0198697 A1* | 7/2014 | Jeanne | ............... | H04N 21/4436 370/311 |
| 2014/0208132 A1* | 7/2014 | Cheston | .................... | G06F 1/26 713/310 |
| 2014/0304832 A1 | 10/2014 | Graham | | |
| 2016/0026477 A1 | 1/2016 | Chu et al. | | |
| 2016/0226727 A1 | 8/2016 | Thaler et al. | | |
| 2017/0257886 A1* | 9/2017 | Adjakple | ............... | H04W 74/04 |
| 2018/0254897 A1* | 9/2018 | Nix | ....................... | H04W 12/02 |
| 2020/0036521 A1* | 1/2020 | Nix | ..................... | H04W 40/005 |
| 2020/0235923 A1* | 7/2020 | Nix | .................... | H04L 63/0435 |

OTHER PUBLICATIONS

Search Query Report from IP.com (performed Mar. 9, 2022) (Year: 2022).*

"Cisco Wireless LAN Controller Configuration Guide, Release 7.0.98.0", Cisco, Retrieved from internet—http://www.cisco.com/c/en/us/td/docs/wireless/controller/7-0/configuration/guide/c70/c70wlan.html, May 22, 2017, 111 Pages.

* cited by examiner

DEVICE MANAGEMENT

BACKGROUND

A computer network may include a telecommunications network which may facilitate communication and/or the sharing of resources between computing devices connected to the computer network. The networked computing devices may exchange data with each other across data connections of the computer network. The data connections between the computing devices may be established utilizing a cabled media or a wireless media.

DETAILED DESCRIPTION

Figure 1:
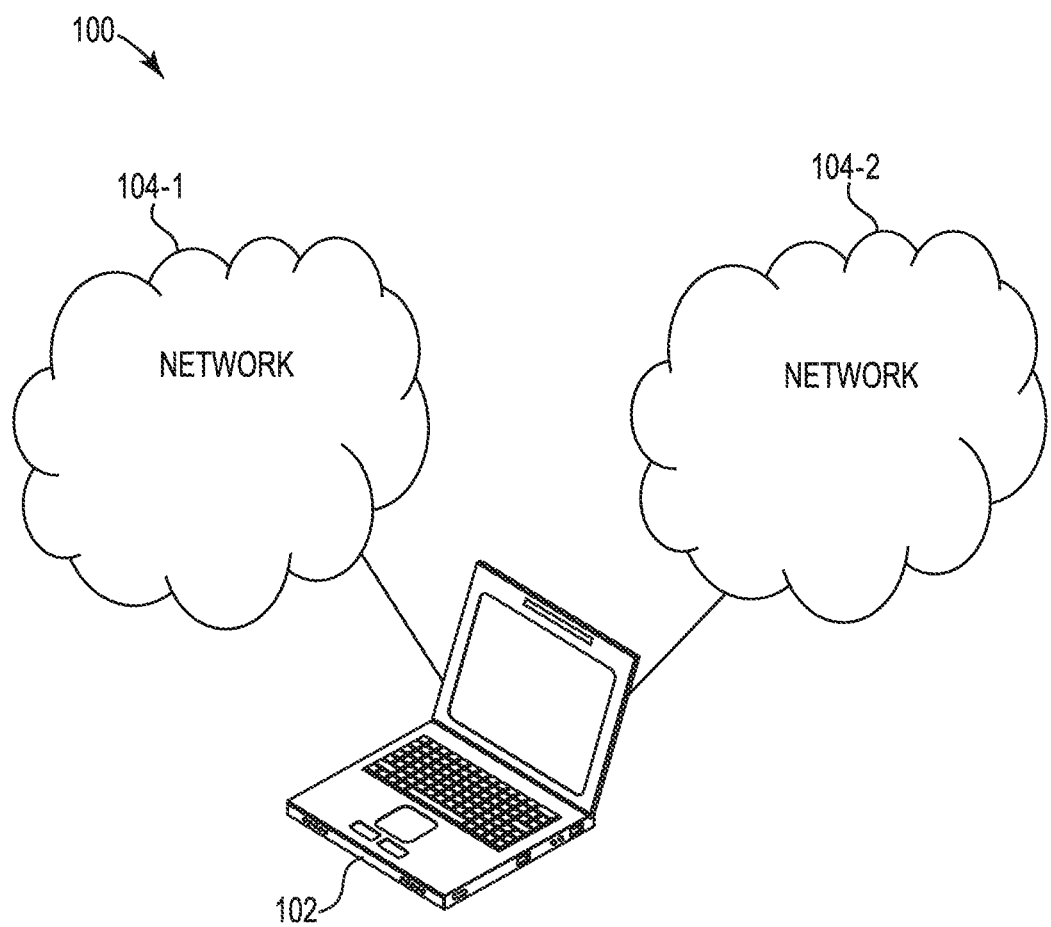
FIG. 1 illustrates an example of a system to perform device management consistent with the disclosure.

Network management may include the process of administering and managing a computer network and/or the computing device on a network. For example, network management may include fault analysis, performance management, provisioning, maintaining a quality of service (QoS), providing security updates, adding software, removing software, modifying software, updating software, managing settings of the computing device, etc. In some examples, network management may be performed manually by a network administrator. In some examples, network management may be at least partially automated utilizing a network management application.

As computing devices become lighter, thinner, and more portable, there is an increasing prevalence in use of wireless data connections to connect computing devices of a computer network. That is, computing networks may utilize wireless connections such as radio frequency based data communication (e.g., Wi-Fi, etc.) to connect with computing devices. Utilizing a wireless connection not only allows the computing device to become untether to a cabled data connection to the network, but it may also allow the user to more easily take the computing device with them in order to utilize the device while they travel and/or are located in a separate physical location from the computer network. Additionally, eliminating the cabled connection and/or the requisite of close proximity to a data connection port may allow a user to roam around to different locations of the physical area covered by wireless data connections of the computing network.

Along with the flexibility of utilizing wireless data connections to a computing network comes an increased security risk. For example, with a wired local area network (LAN) computer network, if you aren't physically cabled to the network then you don't have access to the network. Therefore, with a wired LAN secure facility, such as a building with restricted access, may be utilized to keep unwanted network users and/or computing devices out of the building and off of the network. That is, access to the wired LAN may be physically contained.

In contrast, wireless data connections to a LAN may not be able to be physically contained in the same manner. For example, since radio frequency signals may travel through physical barriers such as walls, a user or computing device may be located physically outside of the building housing the components of the computing network, but may be able to wirelessly access the network. As such, computing networks that include wireless data connections may be inherently less secure.

To address the security weaknesses associated with a wireless data connection to a LAN, LANs including wireless data connections may implement various security protocols for access to the computer network over the wireless data connections. The security protocols may be considered higher level security protocols relative to the security protocols implemented for cabled data connections to the LAN. For example, wireless LANs (WLANs) may implement certificate based wireless security authentication mechanisms such as Extensible Authentication Protocol (EAP), 802.1x, temporal key integrity protocol (TKIP), etc. to restrict access to the computing network.

The higher level security protocols discussed above may involve processing by a supplicant of the operating system of the connecting computing device in order to be properly processed. That is, in order for a computing device connecting to the network to be authenticated to the computing network and allowed to connect to the network, a supplicant of the operating system of the connecting computing device may need to process a portion of the authentication mechanism. An operating system of the connecting computing device may include machine readable instructions executable by a processor to manage the hardware and/or applications of the computing device and provide common services for the applications. The ability of the computing device to function may depend on the operation of the operating system. A supplicant of the operating system may include hardware and/or machine readable instructions executable by a processing resource to process an authentication request including submitting credentials to connect the computing device to the network. The supplicant may be a component of the operating system and/or be reliant upon the active execution by a processing resource of a portion of the machine readable instructions making up the operating system. An authenticator on the computer network may invoke the supplicant installed on the connecting computing device and wait for submission of the proper credentials from the supplicant in order to allow the connecting computing device to establish a wireless connection to the computing network.

Computing devices may perform power management. For example, computing devices may utilize power management schemes to reduce an amount of power they consume. Wireless computing devices may rely on portable power sources with a finite amount of power available to run the wireless computing devices. As such wireless computing devices may utilize power management schemes to extend the amount of time that the wireless device may operate before exhausting the power source and involving a recharge.

A computing device may utilize various system power states in order to achieve power management. For example, a computing device may switch between various power states depending on various operating conditions of the computing state. The power states may correspond to various levels of sleep states. A sleep state may include a distinct configuration of the operation of the computing device wherein various unused components (e.g., hardware, instructions executable by a processor, etc.) of the computing device are, to some extent, disabled or placed in a lower power consumption state. A sleep state of a computing device may correspond to an Advanced Configuration and Power Interface (ACPI) specification power state.

For example, when not in a sleep state a computing device may operate in a configuration corresponding to an ACPI specification S0 working state where the computing device and its components are substantially fully operational, the central processing unit (CPU) of the computing device may execute instructions, the operating system is active, and the computing device is operating at full power. A sleep state may include operating the computing device in a configuration corresponding to an ACPI specification S0 idle state wherein a portion of the components of the computing device are receiving a reduced power supply such as a monitor may be off, but background tasks may still be operating, the operating system may still be active, the CPU may still execute instructions, etc.

A sleep state may include operation of the computing device in a configuration corresponding to an ACPI specification S1 sleep state wherein the computer is consuming less power than in the S0 state. In a configuration corresponding to an ACPI specification S1 sleep state some components of the computing device are powered so the computer can wake to a S0 state from input from a keyboard, local area network (LAN), or a USB device. In a configuration corresponding to an ACPI specification S1 sleep state processor caches may be flushed and the CPU may stop executing instructions. Further, in a configuration corresponding to an ACPI specification S1 sleep state the power supply to the CPU and the volatile memory of the computing device may be maintained and components of the CPU that do not indicate that they are to remain on in the S1 state may be disabled.

A sleep state may include operation of the computing device in a configuration corresponding to an ACPI specification S2 sleep state wherein the computer is consuming less power than in the S1 state. In a configuration corresponding to an ACPI specification S2 sleep state, in addition to the power saving measures discussed above with relation to the S1 state, the CPU may be powered off and a cache of dirty data that is modified within the cache but not modified within the main memory of the computing device may be flushed to the volatile memory of the computing device.

A sleep state may include operation of the computing device in a configuration corresponding to an ACPI specification S3 sleep state wherein the computer is consuming less power than in the S1 or S2 sleep state. In a configuration corresponding to an ACPI specification S3 sleep state, in addition to the power saving measures discussed above with relation to the S1 and S2 sleep states, the volatile memory may remain powered while fans, memory, devices, etc. may be powered down. In a configuration corresponding to an ACPI specification S3 sleep state, an operating system of the computing device may be non-functional and/or a supplicant component of the operating system may be unavailable.

A sleep state may include operation of the computing device in a configuration corresponding to an ACPI specification S4 sleep state wherein the computer is consuming less power than in the S1, S2, and/or the S3 sleep state. In a configuration corresponding to an ACPI specification S4 sleep state, in addition to the power saving measures discussed above with relation to the S1, S2, and S3 sleep states, the contents of the volatile memory of the computing device may be saved to the non-volatile memory of the computing device (e.g., to a hibernation file to preserve the system state). In a configuration corresponding to an ACPI specification S4 sleep state an operating system of the computing device may be non-functional and/or a supplicant component of the operating system may be unavailable. From a configuration corresponding to an ACPI specification S4 sleep state a working context may be restored from the non-volatile memory upon startup of the computing device. The computing device may appear to be off.

A sleep state may include operation of the computing device in a configuration corresponding to an ACPI specification S5 sleep and/or soft off state wherein the computer is consuming less power than in the S1, S2, S3, and/or the S4 sleep state. In a configuration corresponding to an ACPI specification S5 sleep state, in addition to the power saving measures discussed above with relation to the S1, S2. S3, and S4 sleep states, a power source of the computing device will supply a baseline amount of power to return the computing device to operation in a configuration corresponding to an S0 state. Powering up the computing device from the S5 state, unlike the previous states, may involve a full reboot of the computing device. The computing may not retain previous content held in volatile memory and/or or operating state information. In a configuration corresponding to an ACPI specification S5 sleep state an operating system of the computing device may be non-functional and/or a supplicant component of the operating system may be unavailable. The computing device may appear to be off.

As described above, obtaining and/or maintaining access to a secure wireless network may involve the processing by a supplicant of the operating system of the connecting computing device. However, as described above, the computing device may utilize power management schemes that employee configurations where the operating system and/or supplicant of the operating system are disabled and/or unavailable. As such, a wireless computing device may lose its connection to a computing network when the wireless computing device operates in a configuration corresponding to the ACPI specification S3-S5 states.

However, network management operations may involve communicating with computing devices connected to a computing network. In some examples, network management operations may involve communicating with computing devices during periods of the day (e.g., late night and/or early morning) when the computing devices are least likely to be utilized in order to avoid interfering with productivity on the network. Network management operations may include waking computing devices connected to the network from a sleep state in order to perform management of the computing devices. For example, wireless data networks may be based on packets of data sent between computing devices. A network management operation may be implemented using a specially designed wake-on-LAN (WOL) packet to all computing devices connected to a network. The WOL packet may contain the MAC address of a destination computers, an identifying number built into each network interface card or other Ethernet device in a computer that enables it to be uniquely recognized and addressed on a network. Computing devices that are connected to the network and are off or powered down into a sleep state may be capable of listening to incoming packets in the off or powered down state. When the computing device receives a WOL packet that is addressed to the devices MAC address, the MAC may signal the computing device's power supply or motherboard to initiate a system wake-up, much in the same way as pressing the power button would do. The WOL packet may be sent by a network manager on the data link layer (e.g., layer 2 in the OSI model). The WOL packet may be broadcast to all computing devices connected to the given network using the network broadcast address. WOL packets that are broadcast on wireless local area networks (WLAN) may be referred to as wake-on-wireless local area network (WoWLAN) packets.

Since computing devices connected to a computing network via a wireless data connection employing the above described higher level security measures may lose network connectivity upon entering sleep states where the operating system is disabled and/or a supplicant of an operating system is unavailable, they may be unavailable to be managed during network management operations. For example, without a connection to the computing network being managed, a computing device will not be able to receive and/or respond to a WOL packet broadcast on the network. As such, the computing devices either cannot be managed or security measures for the network are stripped away such that a computing device utilizing a wireless data connection may maintain its connection in the absence of an operational operating system and/or accessible supplicant thereof.

In contrast, examples of the present disclosure may include a system to provide for the management of the computing devices utilizing a wireless data connection while preserving the higher level security measures associated with the connection to the network resources. For example, the system may include machine-readable instructions executable by a processing resource to authenticate a computing device to a first wireless network, implementing a first level of security, while in an active state. The system may include machine-readable instructions executable by a processing resource to disconnect from the first wireless network responsive to entering a sleep state. The system may include machine-readable instructions executable by a processing resource to provide, from a basic input/output system (BIOS) of the computing device, a wireless parameter for a second wireless network implementing a second level of security. The system may include machine-readable instructions executable by a processing resource to connect to the second wireless network while in the sleep state.

FIG. 1 illustrates an example of a system to perform device management consistent with the disclosure. The system may include a computing device 102. A computing device 102 may include a stationary or desktop computing device. Alternatively, the computing device 102 may include a mobile computing device such as a laptop computer, a handheld computer, a smartphone, a tablet computer, a smart device, etc. The computing device 102 may include a processing resource and a machine readable medium storing instructions executable by the processing resource to perform various operations.

The computing device 102 may include instructions and/or hardware to establish a wireless data connection to a computing network. For example, the computing device 102 may include a Wi-Fi radio, a Bluetooth radio, and or other chipset for transmitting and/or receiving data wirelessly.

The system 100 may include a first computing network 104-1 and a second computing network 104-2. The first computing network 104-1 may be a wireless local area network (WLAN). The second computing network 104-2 may be a WLAN that is distinct from the first computing network 104-1. The first computing network 104-1 and the second computing network 104-2 may be advertised and/or provided from two separate routers and/or wireless access points. The first network 104-1 and the second network 104-2 may be connected to two separated wired networks. Alternatively, the first network 104-1 and the second network 104-2 may be advertised and/or provided by one or two radios of a same router and/or wireless access point. The first network 104-1 and the second network 104-2 may be connected to a same wired network.

The first computing network 104-1 and the second computing network 104-2 may be associated with distinct service set identifiers (SSIDs). That is, the first computing network 104-1 may have a different SSID than the second computing network 104-2.

The first computing network 104-1 may implement a first level of network security. That is, wireless access by the computing device 102 to the first computing network 104-1 may involve satisfying a first level of security protocols. The first level of security protocols may include certificate based wireless security authentication mechanisms such as EAP 802.1x protocols, TKIPs, etc. Since these security measures may be considered higher level security, access to the first computing network 104-1 may include access to sensitive data and/or other resources on the first computing network 104-1.

The second computing network 104-2 may implement a second level of network security. The second level of network security may include fewer and/or less rigorous security mechanisms that those implemented with respect to the first computing network 104-1. For example, the second computing network 104-2 may implement an open system authentication (OSA). Implementing an OSA may include granting network access to a computing device 102 utilizing the wired equivalent privacy (WEP) protocol. For network access to be granted to a computing device 102, the SSID of the computing device 102 should match the SSID of a wireless access point through which the computing device 102 is attempting to connect to the second computing network 104-2. That is, the SSID may include a sequence of characters that uniquely name a WLAN such as second computing network 104-2. When the computing device 102 attempts to connect to the second computing network 104-2 the computing device 102 may send a request for authentication to a wireless access point and the wireless access point may generate an authentication code for the session. The computing device 102 may accept the authentication code and joint the network as long as the session continues and the computer remains within range of the second computing network 104-2.

Since the security protocols associated with accessing the second computing network 104-2 are relatively low level and non-rigors as compared with the relatively higher level security to access the first computing network 104-1 access to sensitive data and/or other resources on the second computing network 104-2 may be restricted and/or substantially eliminated. For example, the second computing network 104-2 may filter out and/or prohibit network traffic other than a wake on wireless local area network (WoWLAN) packets. That is, traffic across the second computing network 104-2 may be limited to WoWLAN packets. A computing device 102 connected to second computing network 104-2 may be prohibited and/or prevented from other network data and/or access to other network resources.

The computing device 102 may utilize a power management scheme. For example, the computing device may employ various operating configurations to manage power consumption. The operating configurations may correspond to ACPI specification states as described above. For example, the computing device 102 may operate in an active state. Operating in an active state may correspond to operating in an ACPI specification S0 state. For example, the computing device 102 may operate in an active state where the computing device 102 is powered on, the CPU of the computing device 102 is executing or ready to execute instructions, the operating system of the computing device 102 is fully enabled, the supplicant associated with the operating system of the computing device 102 is available for utilization, the peripheral component interconnect of the computing device 102 is fully enabled, the accelerated graphics port of the computing device 102 is fully enabled, volatile memory of the computing device 102 is being read from and/or written to or refreshed, and/or non-volatile memory is active.

While in the active state, a processing resource of the computing device 102 may execute instructions to authenticate the computing device 102 with the first computing network 104-1. Since the operating system is fully enabled and its associated supplicant is available for performing authentication in the active state, the computing device 102 may establish and maintain a connection with the first computing network 104-1 while in the active state. That is, a supplicant of the operating system of the computing device 102 may process an authentication request including submitting credentials to connect and/or maintain a connection from the computing device 102 to the first computing network 104-1.

The computing device 102 may additionally operate in a sleep state. That is, the computing device 102 may transition from an active state to a sleep state. Operating in a sleep state may correspond to operating in an ACPI specification S1, S2, S3, S4, and/or S5 state. For example, the computing device 102 may operate in and/or transition to a sleep state corresponding to an ACPI specification S1 sleep state as described above including where the computing device 102 is powered on, the CPU of the computing device 102 is not executing instructions and is not ready to execute instructions although the registers and caches of the computing device 102 are maintained, the volatile memory of the computing device 102 may be idle but refreshed, the power supply state may be on, and the non-volatile storage may be off. Additionally, the computing device 102 may operate in and/or transition to a sleep state corresponding to an ACPI specification S2 sleep state as described above including where the volatile memory is refreshing normally, the CPU is powered off, and the dirty cache is flushed to volatile memory. The computing device 102 may additionally operate in and/or transition to a sleep state corresponding to an ACPI specification S3 sleep state as described above including where the state may be enabled by a circuit closing jumper on the motherboard of the computing device 102 or by support in a basic input output system (BIOS) of the computing device 102, the CPU of the computing device 102 may not be executing instructions or be ready to execute instructions, the registers and cache of the CPU may not be maintained, the operating system of the computing device 102 may complete flushing dirty pages from a cache upon entering a state but then the operating system may be non-functional and/or a supplicant component of the operating system may be unavailable, the power supply state may set to off, and/or the volatile memory may refresh at a reduced refresh rate relative to predecessor sleep states S1 and S2. The computing device 102 may additionally operate in and/or transition to a sleep state corresponding to an ACPI specification S4 sleep state as described above including where the hardware of the computing device 102 is in an off state and maintains no context data, resuming the system may be limited to a timer or hardware resume device such as a WoWLAN packet, but not by interrupts, the power supply may be in an off state, the operating system of the computing device 102 may be non-functional and/or a supplicant component of the operating system may be unavailable. The computing device 102 may additionally operate in and/or transition to a sleep state corresponding to an ACPI specification S5 sleep state as described above including where the hardware of the computing device 102 is in an off state and maintains no context data, the power supply is in an off state, and/or the operating system of the computing device 102 may be non-functional and/or a supplicant component of the operating system may be unavailable.

The computing device 102 may include executable instructions to disconnect from the first wireless network 104-1 responsive to exiting from the active state and/or entering a sleep state. For example, the computing device 102 may disconnect from the first wireless network 104-1 in response to entering a sleep state corresponding to an advanced configuration and power interface (ACPI) specification S3 sleep state, an ACPI specification S4 sleep state, and/or an ACPI specification S5 sleep state. Since, as described above, the operating system of the computing device 102 and/or a supplicant of the operating system involved in satisfying the security protocol implemented by the first wireless network 104-1 are unavailable when the computing device 102 enters these sleep states, the authentication with and/or maintenance of a connection to the first wireless network 104-1 may not be accomplished in these states.

The computing device 102 may include executable instructions to provide a wireless parameter for the second wireless network 104-2. The wireless parameter may include an SSID associated with and/or identifying the second wireless network 104-2 for the computing device 102 to connect to. Providing the wireless parameter may include configuring a firmware of a wireless network interface controller card of the computing device 102 with the wireless parameter. The wireless parameter may be provided from a BIOS of the computing device 102. For example, since the operating system and/or the supplicant are disabled in the above described sleep states, the BIOS of the computing device 102 may be the source of the SSID. By storing the wireless parameter in and/or providing the wireless parameter from the BIOS while the computer is in a sleep mode the system 100 provides for a complete separation among access to the first network 104-1 and access to the second network 104-2 adding a layer of increased security. Segregating the access to the wireless parameter to an operating configuration when the BIOS is in control of the computing device 102 may prevent abuse and malicious activities by users since the user may have little to no control over the computing device 102 while its operating system is disabled. Since, as described above, the second wireless network 104-2 may employ substantially lower level, more open, and less rigorous security protocols to gain access, protecting access to the second wireless network 104-2 by restricting storage and/or provision of the wireless parameter involved in connecting to the second wireless network 104-2 may serve as an additional layer of security to supplement any security protocols associated with accessing the second wireless network 104-2.

The computing device 102 may include executable instructions to connect to the second wireless network 104-2 while in the sleep state. Again, restricting the connection to the second wireless network 104-2 to during the sleep state may prevent malicious access of the second wireless network 104-2. Connecting to the second wireless network 104-2 may include utilizing the wireless parameter to connect to the second wireless network 104-2.

Once the computing device 102 is connected to the second wireless network 104-2 the computing device may maintain its connection to the second wireless network 104-2 while it is in the sleep state. The computing device 102 may wait in the sleep state to detect a WoWLAN packet. Once the computing device receives a WoWLAN packet the computing device may execute instructions to disconnect from the second wireless network 104-2. The computing device may remain in the sleep state and/or in a transitory state between sleep state and an active state until it has disconnected from the second wireless network 104-2.

In response to the computing device 102 disconnecting from the second wireless network 104-2, the computing device 102 may be triggered to wake and/or complete a wake process to transition to operating in the active state. In the active state, the functionality and/or availability of the operating system and/or its supplicant may be restored. As such, the computing device 102 may execute instructions to connect to the first wireless network 104-1 once again. For example, the computing device 102 may, once it has entered the active state, utilize its operating system supplicant to authenticate the computing device 102 with the network (e.g., by satisfying an authentication mechanism of the second wireless network 104-2 such as an extensible authentication protocol (EAP), an 802.1x protocol, a temporary key integrity protocol (TKIP), and a certificate based protocol). Upon authentication, the computing device 102 may have profile-appropriate access to sensitive data and network resources of the second wireless network 104-2.

Figure 2:
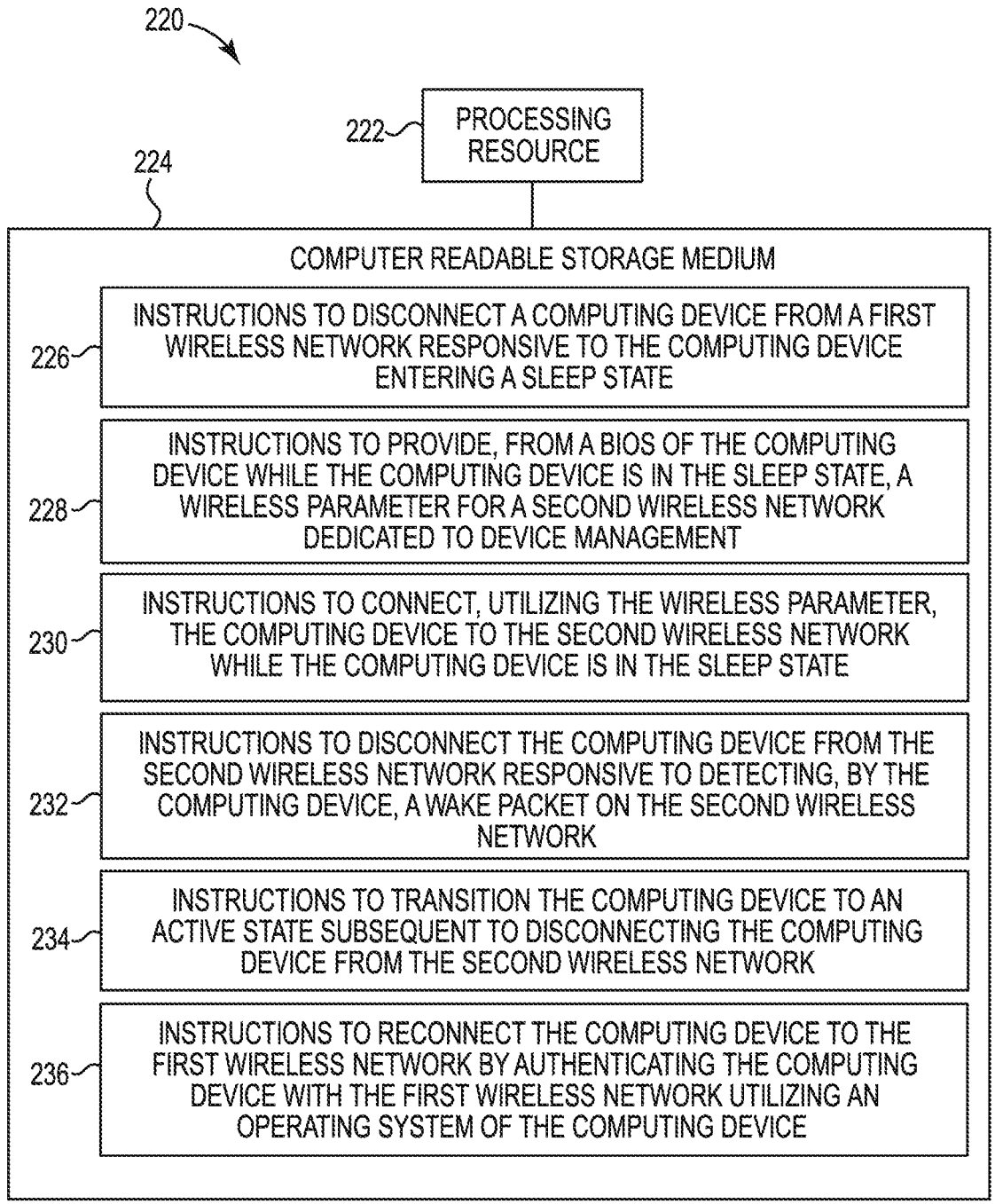
FIG. 2 illustrates a diagram of an example of a processing resource and a non-transitory computer readable medium to perform device management consistent with the disclosure.

FIG. 2 illustrates a diagram 220 of an example of a processing resource 222 and a non-transitory computer readable medium 224 to perform device management consistent with the disclosure. A memory resource, such as the non-transitory computer readable medium 224, may be used to store instructions (e.g., 226, 228, 230, 232, 234, 236, etc.) executed by the processing resource 222 to perform the operations as described herein. A processing resource 222 may execute the instructions stored on the non-transitory computer readable medium 224. The non-transitory computer readable medium 224 may be any type of volatile or non-volatile memory or storage, such as random access memory (RAM), flash memory, read-only memory (ROM), storage volumes, a hard disk, or a combination thereof.

In addition to, or in place of, the execution of executable instructions, various examples of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

The example medium 224 may store instructions 226 executable by the processing resource 222 to disconnect a computing device from a first wireless network in response to the computing device entering a sleep state. For example, the computing device may detect a trigger to transition to a sleep state corresponding to an ACPI specification state S3, S4, and/or S5 from an active state corresponding to an ACPI specification state S0 or from a sleep state corresponding to an ACPI specification state S1 or S2. The computing device may actively terminate the connection with the first wireless network in response to detecting the trigger. Alternatively, the connection between the computing device and an access point broadcast the first wireless network may be terminated as a result of the operating system and/or a supplicant of the operating system of the computing device being disabled and/or rendered unavailable by operation of the computing device in the sleep state.

The first wireless network may include a wirelessly accessible computing network. The first wireless network may provide connected computing devices access to an internet connection, data available across the first wireless network, and/or access to network resources (e.g., data storage, other computing devices, servers, web services, virtual machines, instructions executable by a processor, processing resources, printers, scanners, fax machines, access points, modems, routers, etc.). The first wireless network may employee security protocols to prevent unauthorized access to the network. For example, the first wireless network may utilize an extensible authentication protocol (EAP), an 802.1x protocol, a temporary key integrity protocol (TKIP), and/or a certificate based protocol. As such, for the computing device to establish and/or maintain a connection to the first wireless network, the supplicant of the operating system of the computing device may authenticate the computing device with the first wireless network.

The example medium 224 may store instructions 228 executable by the processing resource 222 to provide a wireless parameter for establishing a connection to a second wireless network. For example, the wireless parameter may be utilized to identify and/or establish a connection with the second wireless network. For example, a network interface controller card of the computing device may utilize the wireless parameter to identify the second wireless network to connect to. The wireless parameter may include a service set identifier of the second wireless network. The second wireless network may include a wirelessly accessible computing network. The second wireless network may employ an open system authentication whereby the computing device may connect to the second wireless network so long as the computing device is able to identify the second wireless network based on the wireless parameter.

The first wireless network and the second wireless network may have access to and/or be in communication with data and/or network resources of a common network infrastructure (e.g., common access points, a common Internet connection, common routers, common modems, a common cabled data connection source, common data storage, access to common computing devices, common servers, common web services, common virtual machines, common instructions executable by a processor, common processing resources, common printers, common scanners, common fax machines, etc.), etc.). However, the access to the common resources across the second wireless network may be limited. For example, computing devices connected to the second wireless network may have their access limited to a portion of the common resources that associated with the transition of the computing device to the active state. For example, the second wireless network may be a wireless network dedicated to device management. That is, the second wireless network may be a wireless network maintained and/or utilized for the performance of device management of computing devices that are intended to be utilized on the first wireless network when they are in an active state. For example, the first wireless network may be a productivity network maintained and/or utilized to conduct work, entertainment, and/or business across, where the second wireless network is a device management network that is maintained and/or utilized for the sole purpose of managing computing devices that will utilize the first wireless network when they are in an active state, but are in a sleep state at the time of the device management operations.

Traffic across the second wireless network may be limited wake packets. Wake packets may include a broadcast frame, targeting a specific type of network interface, enabling a remote access of a network manager to the computing device in the sleep state. Specifically, the wake packets may cause the computing device to transition from a sleep state to an active state for device management operations to be performed thereupon. For example, the wake packets may include data packets such as WOL and/or WoWLAN network messages. As such, the computing devices connected to the second wireless network may have their access limited to wake packets originating from the common network infrastructure between the first and second wireless networks.

The wireless parameter provided for identifying and/or establishing a connection to the second wireless network may be stored in and/or provided from the BIOS of the computing system. For example, the firmware of a wireless network interface controller card of the computing device may be configured with the wireless parameter by the BIOS. Since the provision of the wireless parameter is handled by the BIOS, the operating system and/or its supplicant need not be enabled or available for the wireless parameter to be provided.

The example medium 224 may store instructions 230 executable by the processing resource 222 to connect the computing resource to the second wireless network. The computing resource may be connected to the second wireless network utilizing the wireless parameter. For example, a wireless network interface may utilize the SSID provided by the BIOS to establish a connection to the second wireless network. Both the provision of the wireless parameter and the connection to the second wireless network may be established while the computing device is in the sleep state. Therefore, both the provision of the wireless parameter and the connection to the second wireless network may be established while an operating system and/or a supplicant of the operating system of the computing device may be disabled and/or unavailable due to its operation in a sleep state.

The example medium 224 may store instructions 232 executable by the processing resource 222 to disconnect the computing device from the second wireless network. The computing device may disconnect from the second wireless network responsive to detecting a wake packet on the second wireless network. The computing device may disconnect from the second wireless network subsequent to receiving the wake packet but prior to leaving the sleep state. That is, the computing device may disconnect from the second wireless network while it is in the sleep state and/or before it has entered an active state.

In some examples, the computing device may disconnect from the second wireless network responsive to a prompt to exit the sleep state. The prompt may be a prompt other than a wake packet. The prompt may include a command from a user and/or a timer to exit the sleep state. For example, a user may hit a power button and/or click a mouse pad to wake the computing device back to an active state. The computing device may disconnect from the second wireless device before entering the active state.

The example medium 224 may store instructions 234 executable by the processing resource 222 to transition the computing device to an active state. Transitioning the computing device may include exiting a sleep state and entering an active state. In some examples, transitioning the computing device may include restoring a power supply and/or a functionality of the computing device. The computing device may be transitioned into the active state subsequent to disconnecting the computing device from the second wireless network.

The example medium 224 may store instructions 236 executable by the processing resource 222 to reconnect the computing device to the first wireless network. The computing device may be reconnected to the first wireless computing network by authentication of the computing device with the first wireless network. For example, the computing device may satisfy a security protocol implemented to secure the first wireless network through an authentication mechanism. The computing device may be authenticated with the first wireless network utilizing an operating system of the computing device and/or a supplicant of the computing device operating system. Since the authentication involves the operating system of the computing device, the authentication and/or reconnection may occur while the computing device is in an active state.

Figure 3:
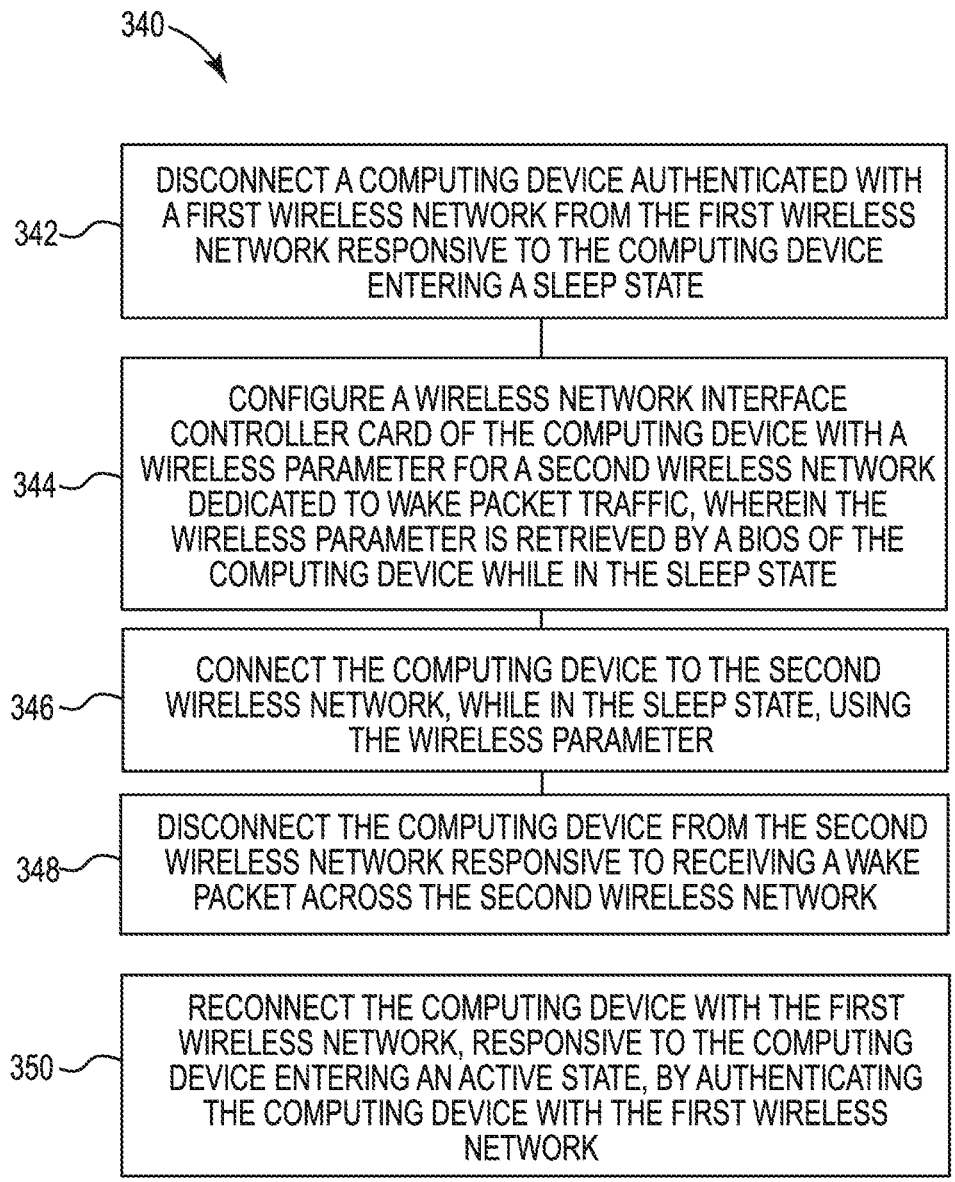
FIG. 3 illustrates a flow diagram of an example of a method to perform device management consistent with the disclosure.

FIG. 3 illustrates a flow diagram of an example of a method 340 to perform device management consistent with the disclosure. At 342, the method 340 may include disconnecting a computing device from a first wireless network. The computing device may be wirelessly connected to the first wireless network. The first wireless network may include a computing network to be utilized for personal, business, entertainment, and/or other productivity purposes.

The computing device may have authenticated itself with the first wireless network. The computing device may have utilized its operating system, while in an active state, to authenticate itself to the first wireless network. The computing device may be disconnected from the first wireless network in response to the computing device entering a sleep state.

At 344, the method 340 may include configuring a wireless network interface controller card of the computing device with a wireless parameter for a second wireless network. The wireless parameter may include an identifier of a second wireless network dedicated to wake packet traffic. The wireless parameter for the second wireless network may be stored and/or retrieved by a BIOS of the computing device.

The BIOS may retrieve the wireless parameter while the computing device is in a sleep state where the operating system is disabled. As such configuring the wireless network interface controller card of the computing device with the wireless parameter from the BIOS of the computing device may include configuring the wireless network interface controller by utilizing a unified extensible firmware interface (UEFI) call issued from the BIOS responsive to detecting the computing device is in the sleep state.

At 346, the method 340 may include connecting the computing device to the second wireless network. The second wireless network may include a network that is substantially dedicated to device management of computing devices in a sleep state that may connect to and/or utilize the first wireless network in the future.

The computing device may connect to the second wireless network while it is operating in a sleep state. The computing device may identify and/or connect to the second wireless network utilizing the wireless parameter configured to the wireless network interface controller by the BIOS.

At 348, the method 340 may include disconnecting the computing device from the second wireless network. The computing device may disconnect from the second wireless network while it is operating in a sleep state. The computing device may disconnect from the second wireless network in response to detecting and/or receiving a wake packet across the second wireless network. For example, the computing device may disconnect from the second wireless network in response to receiving a WoWLAN packet over the second wireless network while in a sleep state.

At 350, the method 340 may include reconnecting the computing device with the first wireless network. The computing device may be reconnected to the first wireless network in response to the computing device entering an active state. Reconnecting the computing device to the first wireless network may include re-authenticating the computing device with the first wireless network.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 102 may refer to element "02" in FIG. 1. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense. Further, as used herein, "a" and "a number of" an element and/or feature can refer to one or more of such elements and/or features.

What is claimed:

1. A system comprising:
    a computing device comprising a memory resource having executable instructions to:
        authenticate the computing device to a first wireless network implementing a certificate based first level of security while the computing device is in an active state and process the authentication utilizing a supplicant of an operating system of the computing device;
        disconnect from the first wireless network responsive to entering a sleep state;
        provide, from a basic input/output system (BIOS) of the computing device, a wireless parameter for a second wireless network implementing an open system authentication second level of security;
        connect to the second wireless network while in the sleep state;
        disconnect from the second wireless network responsive to detecting a wake packet on the second wireless network; and
        reconnect with the first wireless network, responsive to entering an active state upon disconnecting from the second wireless network, by authenticating the computing device with the first wireless network.

2. The system of claim 1, wherein the certificate based first level of security includes an authentication mechanism selected from the group consisting of an extensible authentication protocol (EAP), a 802.1x protocol, and a temporary key integrity protocol (TKIP).

3. The system of claim 1, wherein the active state includes an advanced configuration and power interface (ACPI) specification S0 state.

4. The system of claim 1, wherein the sleep state is selected from the group consisting of an advanced configuration and power interface (ACPI) specification S3 state, an ACPI specification S4 state, and an ACPI specification S5 state.

5. The system of claim 1, wherein the second wireless network filters out network traffic other than a wake on wireless local area network (WoWLAN) network message.

6. A non-transitory computer-readable medium containing instructions executable by a processor to cause the processor to:
    disconnect a computing device authenticated with a first wireless network from the first wireless network responsive to the computing device entering a sleep state, wherein the first wireless network implements a certificate based first level of security;
    provide, from a basic input/output system (BIOS) of the computing device while the computing device is in the sleep state, a wireless parameter for a second wireless network dedicated to device management, wherein the second wireless network implements an open system authentication second level of security;
    connect, utilizing the wireless parameter, the computing device to the second wireless network while the computing device is in the sleep state;
    disconnect the computing device from the second wireless network responsive to detecting, by the computing device, a wake packet on the second wireless network;
    transition the computing device to an active state subsequent to disconnecting the computing device from the second wireless network; and
    reconnect the computing device to the first wireless network by authenticating the computing device with the first wireless network utilizing a supplicant of an operating system of the computing device.

7. The non-transitory computer-readable medium of claim 6, wherein the wake packet includes a broadcast frame, targeting a specific type of network interface, enabling a remote access to the computing device in the sleep state.

8. The non-transitory computer-readable medium of claim 6, wherein:
    the first wireless network and the second wireless network have access to resources of a common network infrastructure; and
    the access of the second wireless network to the resources is limited to a portion of the resources associated with the transition of the computing device to the active state.

9. The non-transitory computer-readable medium of claim 6, including instructions executable by the processor to identify the second wireless network to connect with based on the wireless parameter.

10. The non-transitory computer-readable medium of claim 6, wherein the wireless parameter includes a service set identifier (SSID) of the second wireless network.

11. The non-transitory computer-readable medium of claim 6, including instructions executable by the processor to configure a firmware of a wireless network interface controller card of the computing device with the wireless parameter.

12. A method comprising:
    disconnecting a computing device authenticated with a first wireless network from the first wireless network responsive to the computing device entering a sleep state, wherein the first wireless network implements a certificate based first level of security;

configuring a wireless network interface controller card of the computing device with a wireless parameter for a second wireless network dedicated to wake packet traffic, wherein the wireless parameter is retrieved by a basic input/output system (BIOS) of the computing device while in the sleep state;

connecting the computing device to the second wireless network, while in the sleep state, using the wireless parameter, wherein the second wireless network implements an open system authentication second level of security;

disconnecting the computing device from the second wireless network responsive to receiving a wake packet across the second wireless network; and reconnecting the computing device with the first wireless network, responsive to the computing device entering an active state, by authenticating the computing device with the first wireless network utilizing a supplicant of an operating system of the computing device.

13. The method of claim 12, comprising configuring the wireless network interface controller card of the computing device with the wireless parameter from the basic input/output system (BIOS) of the computing device by a unified extensible firmware interface (UEFI) call issued from the BIOS responsive to detecting the computing device is in the sleep state.

\* \* \* \* \*